United States Patent Office 3,359,118
Patented Dec. 19, 1967

3,359,118
TASTE IMPROVEMENT FOR BEVERAGE WHITENERS
Anne Josephine Neilson, Cambridge, and Richard Lawrence Hughes, West Roxbury, Mass., assignors, by mesne assignments, to Abbott Laboratories, Chicago, Ill., a corporation of Illinois
No Drawing. Filed Dec. 16, 1964, Ser. No. 418,896
2 Claims. (Cl. 99—63)

The present invention relates to a method of improving and enhancing the taste of beverages to which non-dairy beverage whiteners are added.

The use of non-dairy beverage whiteners has become more and more accepted in recent years, mainly because of their stability during storage and because they are more practical than providing a pitcher with cream or milk when coffee, tea, and the like are served. They have a further advantage in being more economical and they are just as easy to measure and use in the desired quantity as the dairy products for which they are substitutes. These non-dairy beverage whiteners are usually made from vegetable oils and possibly for this reason their taste is not comparable to that of the dairy products which they replace. The non-equivalence of taste is probably the major reason why these artificial whiteners have not found complete and universal acceptance in every household.

It is thus the main object of the present invention to improve the flavor and taste of a non-dairy beverage whitener. Other objects will be apparent from the following disclosure and examples.

The object of this invention is accomplished by the process of adding to a non-dairy beverage whitener between 0.02% and 0.1% by weight of cyclohexylsulfamic acid (hereinafter referred to as cyclamic acid) and uniformly distributing said cyclamic acid in said beverage whitener. Cyclamic acid is the anion of sodium and calcium cyclamates which have found widespread acceptance as artificial sweeteners. Cyclamic acid itself has a sour-sweet taste but in the amounts specified above, neither the sourness or the sweetness thereof can be detected when said beverage whitener is used in the customary amounts in the beverage for which it is intended. The absence of the sour-sweet note from the final consumer product, e.g., hot coffee or tea, is not surprising since the above specified amounts of cyclamic acid are such that the final product contains amounts only at or below the threshold level of cyclamic acid in a medium of the nature of a beverage. However, it is surprising to find that the addition of such a small quantity of cyclamic acid materially changes and improves flavor and taste of the beverage to which it is added with the dairy product substitute. In addition to enhancing the taste and flavor of the beverage to which the non-dairy beverage whitener containing the above amount of cyclamic acid has been added, said beverage also has greater creaminess (in flavor and texture) and, also surprisingly, the side taste objected to by many consumers is greatly reduced or eliminated. This side taste is based on the presence of fat or oils of vegetable origin and is present whether these fats or oils are in their natural form or whether they are hydrogenated to a certain degree.

The effects of the method of the present invention are better described in view of the following examples which serve as an illustration only and are not meant to limit the invention to the products specifically listed. The flavor descriptions given are based on the findings of a highly-specialized flavor panel using the "Flavor Profile Analysis" method established by Arthur D. Little, Inc., and published in "Flavor Research and Food Acceptance" (Reinhold Publishing Corp., New York, 1958; p. 65 ff.).

*Example*

The following non-dairy beverage whiteners were used: Coffee-mate®, marketed by The Carnation Company; improved (non-dairy) Pream®, marketed by H. C. Moores Company, and Cremora®, marketed by The Borden Company. In all tests, the flavor panel sampled, side by side, a series of hot coffees of the same brand, containing no cyclamic acid, 0.02% of cyclamic acid as based on the amount of whitener added, and 0.1% of cyclamic acid based on the amount of whitener. Another series was sampled with cold coffee, and a third series used hot tea as the consumer product. In all instances, the control samples were described as having a thin, flat, boiled-milk taste with some cowiness and some sourness as the side notes. All samples containing 0.02% of cyclamic acid show fuller flavor and more creamy flavor characteristics; they are also better blended, show a more milky character while being less sour, and having less cowy flavor characteristics. The test samples containing the higher amount of cyclamic acid were described as having a higher degree of blended flavor, with a fuller and creamier texture. In a blind study, every flavor panel member was able to note the improvement obtained by the additive mainly because of the pronounced creamy character of the beverage so treated and the better-balanced blend of flavor notes.

The above-mentioned beverage whiteners contain, generally, above 30% of fats of vegetable origin, the remaining weight being made up of corn syrup solids, sodium caseinate, sodium silico-aluminate, emulsifiers, di-potassium phosphate, proteins, and moisture.

When the amount of cyclamic acid used above is increased beyond the 0.1% by weight limitation given above, the advantageous characteristics still prevail, but the beverage to which the whitener so treated is added appears to have an additional sweetness which is objectionable to many consumers. When the cyclamic acid addition is below the above range, an improvement in the flavor of the consumption-ready beverage is only detectable by the most sensitive consumer.

The process of the present invention provides a simple means of improving the quality of the artificial beverage whiteners. Actually, in many instances, the beverage whitened by the use of an artificial whitener containing 0.02% and 0.1% of cyclamic acid resembles very closely a beverage containing an equivalent amount (as measured by whiteness) of natural cream.

Others may practice the invention in any of the numerous ways which will be suggested to one skilled in the art by the present disclosure. All such practice of the invention is considered a part hereof provided it falls within the scope of the appended claims.

We claim:
1. The process of adding, on a dry basis, between 0.02% and 0.1% by weight of cyclamic acid to a non-dairy beverage whitener and uniformly blending said cyclamic acid into said beverage whitener.
2. A non-dairy beverage whitener containing, on a dry basis, between 0.02% and 0.1% by weight of cyclamic acid, said cyclamic acid being uniformly distributed in said beverage whitener.

References Cited

UNITED STATES PATENTS 2,876,104   3/1959   Bliudzius et al. _____ 99—141
3,097,947   7/1963   Kemmerer _____ 99—141

OTHER REFERENCES

Altschull, "Processed Plant Protein Foodstuffs," 1958.

A. LOUIS MONACELL, *Primary Examiner.*
H. H. KLARE, *Assistant Examiner.*